E. H. H. SMITH.
SERVING PLATTER.
APPLICATION FILED FEB. 8, 1909.
924,849.
Patented June 15, 1909.
Fig.1
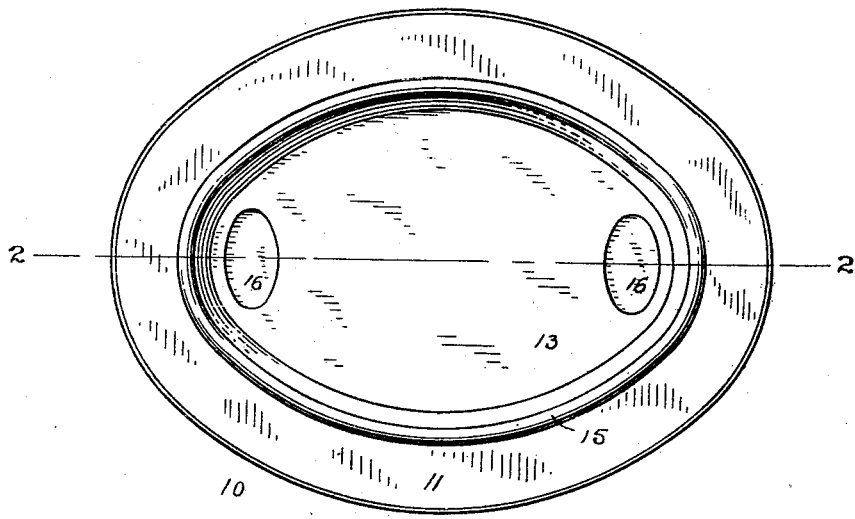
Fig.2.
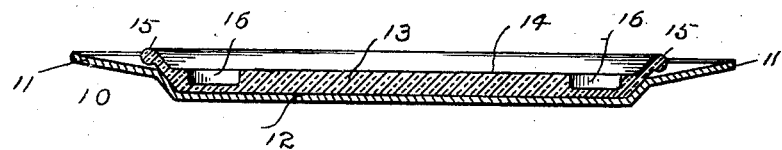
Fig.3.
WITNESSES
H. A. Lamb.
S. W. Atherton
INVENTOR
Eugene H. H. Smith
BY
A. M. Wooster
ATTORNEY

UNITED STATES PATENT OFFICE.

EUGENE H. H. SMITH, OF BRIDGEPORT, CONNECTICUT.

SERVING-PLATTER.

No. 924,849.     Specification of Letters Patent.     Patented June 15, 1909.

Application filed February 8, 1909. Serial No. 476,808.

*To all whom it may concern:*

Be it known that I, EUGENE H. H. SMITH, a citizen of the United States, residing at Bridgeport, county of Fairfield, State of Connecticut, have invented a new and useful Serving-Platter, of which the following is a specification.

This invention has for its object to provide a two-part heat retaining serving platter adapted for serving roasts, steaks, poultry, etc., in brief for serving any article of food that requires to be kept hot as long as possible and especially adapted for serving various kinds of food that are carved upon the table, the special objects being, in addition to keeping the food hot, to provide a platter that may be made highly ornamental, shall not be liable to injury in use so that it will retain its beauty for an almost unlimited length of time, shall be relatively inexpensive to produce and shall be provided with a removable earthenware base preferably glazed upon its upper side, which will receive most of the wear of use and prevent the carrier, ordinarily made of metal either solid or plated, from being scratched, cut or worn by a carving knife or fork.

With these and other objects in view I have devised the simple and novel two-part platter of which the following description in connection with the accompanying drawing is a specification, reference characters being used to indicate the several parts.

Figure 1 is a plan view of my novel platter as in use; Fig. 2 a longitudinal section on the line 2—2 in Fig. 1; and Fig. 3 is a detail sectional view of the earthenware base, on an enlarged scale, showing the glazing.

10 denotes the carrier or platter proper which may be made of any suitable material, preferably metal either solid or plated, and which may be made highly ornamental. The carrier comprises an inclined circumferential rim 11 and a central depression 12 which receives the base 13. The base may be made of any suitable material but is preferably made of earthenware and may or may not be glazed on its upper side as indicated at 14 in Fig. 3. The bases are made to fit closely in depression 12 and are provided with a roll 15 around the edge for convenience in lifting them from and placing them in the depression in the carrier. The roll 15 of the inner member or base 13 not only facilitates the insertion or removal of said member, but it provides means for keeping gravy or juices of the meat from escaping into the carrier 10, and also guards the metal rim of said carrier from being cut and marred by the carving knife.

16 denotes pockets in the base any number of which may be provided to form wells for the gravy or drippings from meats.

The bases are made in sizes to correspond with the sizes of the depressions in the carriers and are interchangeable. They are made and sold independently of the carriers and may be readily replaced if broken. A number of bases may be furnished with each carrier so that succeeding courses of a dinner may be served upon different well heated bases placed upon the same carrier which does not require to be heated and does not become heated to an uncomfortable degree in use.

Having thus described my invention, I claim:—

1. A platter comprising two nested separable members, the inner one being of heat retaining material and of lesser area than the outer member and having a margin or rim raised above the plane of the adjacent portion of the outer member.

2. A serving platter comprising a metallic carrier having a central depression and a removable earthenware base of lesser area than the carrier and engaging the depression and provided with pockets and having a margin or rim above the plane of the adjacent portion of the carrier, substantially as described, for the purpose specified.

In testimony whereof I affix my signature, in presence of two witnesses.

EUGENE H. H. SMITH.

Witnesses:
GEORGE P. ITTIG,
H. V. SMITH.